UNITED STATES PATENT OFFICE.

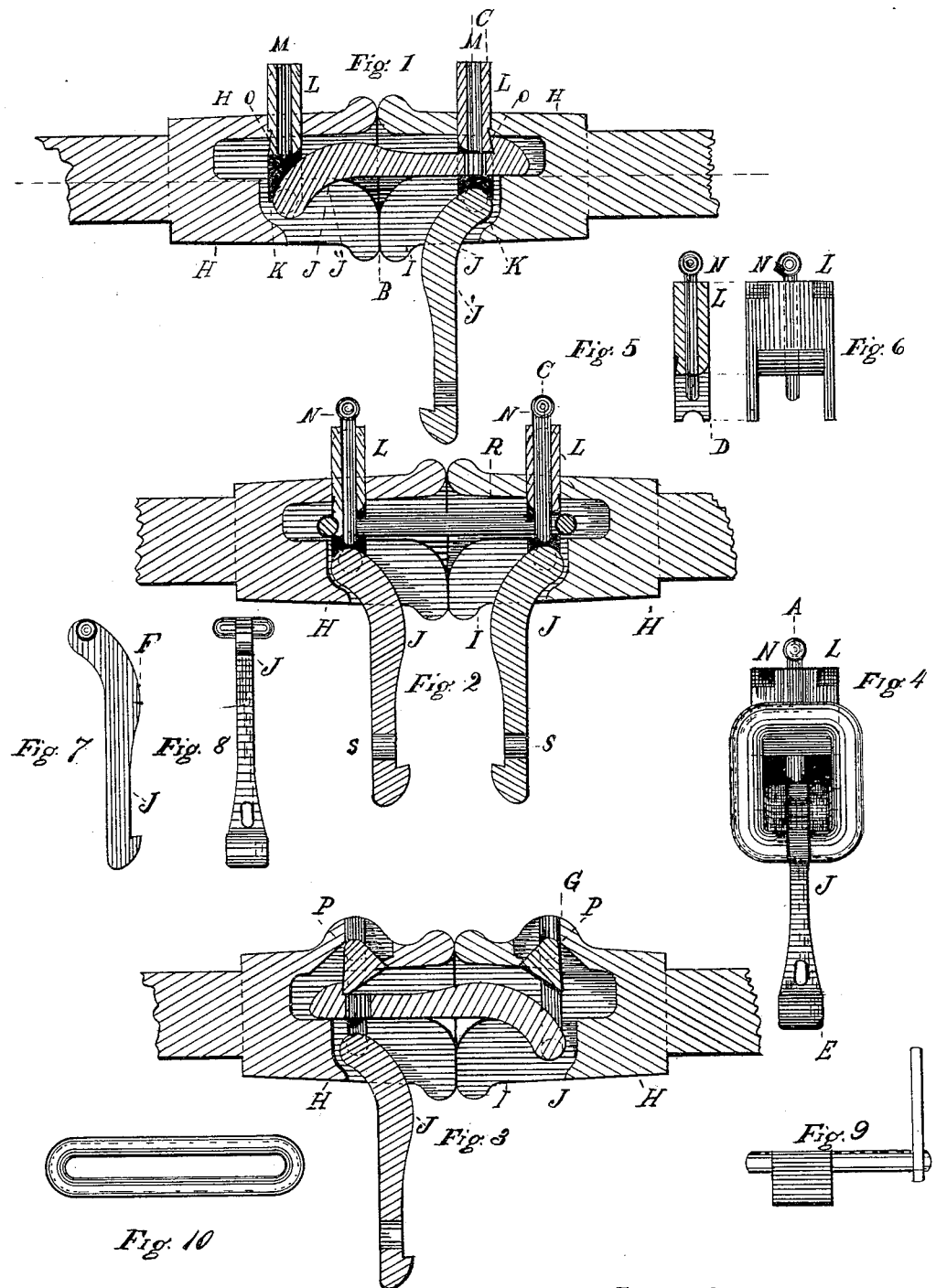

WILLIAM SHERIDON, OF TOLEDO, OHIO.

CAR-COUPLING.

SPECIFICATION forming part of Letters Patent No. 350,993, dated October 19, 1886.

Application filed March 6, 1886. Serial No. 194,267. (No model.)

*To all whom it may concern:*

Be it known that I, WILLIAM SHERIDON, a citizen of the United States, residing at Toledo, in the county of Lucas and State of Ohio, have invented a new and useful Improvement in Car-Couplings, of which the following is a specification.

The nature and objects of my invention are as follows.

My invention relates to improvements in car-couplings which shall be so constructed as that each coupling, while it carries a sliding or a rolling locking-block, shall both be adapted to carry duplicate and instantaneously-exchangeable hooks, either of which, and one only of which, can be used to lock said coupling together at one time, the other hook falling through a bifurcation in the coupling's case, and being out of the way while its mate hook is in use, the same as though it were entirely removed from the coupling-case in which it is located, and which may be done, if desired.

The object of having the two hooks before named being the double assurance of having at least one hook present when it is wanted for use, and the object of having them instantaneously exchangeable being that they may be used in any coupling of this class without the removal and replacement of connecting bolts or pins.

Another object of my invention is to provide a coupling having the above qualities, and which shall also be adapted to use the common coupling-link, as hereinafter described.

I attain these objects by the mechanism illustrated in the accompanying drawings, in which—

Figure 1 is a section elevation on line A, Fig. 4. Fig. 2 is also a sectional elevation on line A, Fig. 4, and illustrates a pair of couplings locked together with a common link. Fig. 3 is also a sectional elevation on line A, Fig. 4, and shows a pair of couplings having a rolling block, instead of a sliding locking block or cam. Fig. 4 is a front end view on line B, Fig. 1. Fig. 5 is a vertical section of the sliding locking-block with pin inserted on line C, Fig. 2. Fig. 6 is a face view of Fig. 5 on line D. Fig. 7 is a side view of my improved hook on line E, Fig. 4. Fig. 8 is front view of said hook on line F, Fig. 7. Fig. 9 is a front view of a rolling locking-block, which may be used as a substitute for the sliding locking-block (shown in Figs. 5 and 6) taken on line G, Fig. 3. Fig. 10 is a top view of an old-style coupling-link.

Similar letters refer to similar parts throughout the several views.

In Fig. 1 is illustrated a pair of my improved couplings, in which H represents the case, having the bifurcation I, in which the connecting-hook J is loosely and removably journaled in a recess at K. Either of these hooks J' J" is adapted to be dropped out of the way of an approaching corresponding hook (J' or J", as the case may be) from and in the mate coupling, and in this position is, besides being out of the way, out of use while its opposite hook is in use.

L represents a sliding locking-block operating vertically in a recess, K, in the case H. This block L has a vertical hole, M, through its center for the reception of the link-pin N, and the rear face of the said block has an incline plane surface, O, for engaging and holding the connecting-hook, as will hereinafter be more fully explained.

The operation of this device is as follows: When these couplings are not locked together, the hook J depends, as shown at J in Fig. 1, and when the said hook is in this position in a case, H, it will not engage and lock with its mate coupling until it has been lifted into operating position, as shown at J", Fig. 1; but after it has been so lifted it is in position to pass into the cavity I of a mate coupling when the front inclined end of the said hook J" engages with and lifts the locking-block L, and when the catch end of said hook passes beyond the inclined surface O of the locking-block L the said locking-block falls and the couplings are fastened together, the drawing-face of the said hooks corresponding in form and inclination to the incline plane surface of the locking-block. In like manner the locking-hook J' of the opposite coupling may (instead of the hook J") be brought into use, one only of the said hooks J' and J" being used at a time. The couplings having been locked together, as before described, in order to disengage them it is only necessary to lift the block L when the couplings may be separated.

I do not confine myself exclusively to the use of the sliding locking-block L, for a rolling block, P, Figs. 3 and 9, may be substituted, and be of equal value and within the scope of my invention.

To operate the sliding locking-block L, or the rolling locking-block P from between on either side or from above the cars, (upon which these couplings are in use,) for the purpose of releasing the coupling, any suitable lever or cam device may be applied, and such attachments being in common use are no part of my invention, and consequently I have not shown and make no claims to such attachments.

When for any reason it becomes necessary or desirable to use as a connecting medium between a pair of my improved couplings a link, (shown in Fig. 10,) the hooks J' and J'' may be entirely removed from both couplings or left pendent, as shown at J in Fig. 2, and the link may be substituted, as shown at R in Fig. 2, and locked by means of the pins N N, and when for any reason it is desirable to use the pins N in connection with the locking-block L and the hooks J, the said pin N may be passed through the hole S in the neck of the hook J, thereby making a doubly-secure fastening.

In order that the locking-hook may be permitted to drop out of the way or depend, as shown in Figs. 1, 2, and 3, for the purpose hereinbefore described, the cavity I is extended or cut clear through the lower side of the case H.

Having described my invention, what I claim as new, and desire to secure by Letters Patent, is—

1. In a car-coupling having the locking-block L, case H, and hook J, the bifurcation I, in which the hook J is pivoted, substantially as shown, and for the purpose described.

2. In combination with the case H, having the bifurcation I and locking-block L, the hook J, pivoted in and adapted to swing within the said bifurcation, and substantially as shown, and for the purpose specified.

3. In combination with the case H, having the bifurcation I, in which the hook J is pivoted, the locking-block L, and adapted to engage with the hook J, substantially as shown, and for the purpose specified.

4. A pair of car-couplings having the cases H H, locking-blocks L L, or either of them, and bifurcations I I, in which bifurcations are pivoted the interchangeable hooks J' or J J, said mechanism being adapted to lock and to be locked together by the use of one hook J and one locking-block L, each hook J and each locking-block L so in use being located in an opposite case, H, another hook J, and another locking-block L, if such are allowed to remain in the cases H H, or either of them, being in such positions that they will remain out of use, passive, and out of the way of all other members of said coupling before named while they are in use, substantially as shown and described.

WILLIAM SHERIDON.

Witnesses:
LESLIE H. COLBURN,
M. J. RUSSELL.